US008908618B2

(12) United States Patent
Taki et al.

(10) Patent No.: US 8,908,618 B2
(45) Date of Patent: Dec. 9, 2014

(54) WIRELESS COMMUNICATION DEVICE AND COMMUNICATION METHOD THEREOF

(75) Inventors: Daisuke Taki, Yokohama (JP); Masahiro Sekiya, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 937 days.

(21) Appl. No.: 13/050,062

(22) Filed: Mar. 17, 2011

(65) Prior Publication Data

US 2012/0069828 A1 Mar. 22, 2012

(30) Foreign Application Priority Data

Sep. 21, 2010 (JP) ................................ 2010-211276

(51) Int. Cl.

| | |
|---|---|
| ***H04W 4/00*** | (2009.01) |
| ***H04L 12/28*** | (2006.01) |
| ***H04L 12/56*** | (2006.01) |
| ***H04J 3/16*** | (2006.01) |
| ***H04W 88/16*** | (2009.01) |
| *H04W 74/08* | (2009.01) |

(52) U.S. Cl.

CPC .......... *H04W 88/16* (2013.01); *H04W 74/0816* (2013.01); *H04W 74/0875* (2013.01)

USPC ......... 370/329; 370/392; 370/395.5; 370/468

(58) Field of Classification Search

None

See application file for complete search history.

(56) References Cited

U.S. PATENT DOCUMENTS

| | | | | |
|---|---|---|---|---|
| 2007/0258384 | A1 | 11/2007 | Sammour et al. | |
| 2010/0260138 | A1* | 10/2010 | Liu et al. | 370/330 |
| 2010/0260159 | A1* | 10/2010 | Zhang et al. | 370/338 |
| 2011/0103280 | A1* | 5/2011 | Liu et al. | 370/311 |
| 2011/0116401 | A1* | 5/2011 | Banerjea et al. | 370/252 |
| 2011/0116487 | A1* | 5/2011 | Grandhi | 370/338 |
| 2011/0317630 | A1* | 12/2011 | Zhu et al. | 370/329 |

FOREIGN PATENT DOCUMENTS

| | | |
|---|---|---|
| JP | 2009-529292 | 8/2009 |

* cited by examiner

*Primary Examiner* — Faruk Hamza
*Assistant Examiner* — Cassandra Decker
(74) *Attorney, Agent, or Firm* — White & Case LLP

(57) ABSTRACT

According to one embodiment, a wireless communication device includes a first transmitting/receiving unit, a first physical processor, and a first MAC processor. The first transmitting/receiving unit transmits one first wireless signal and receives a second wireless signal by a first wireless communication method using a frequency band with a certain bandwidth. The first physical processor decodes the second wireless signal to obtain a frame and encodes a frame of the first wireless signal to be transmitted. The first MAC processor supplies a control frame generated by embedding a first frame to a MAC header of a second frame to the physical processor as the frame. The first frame is recognizable by the first wireless communication method and a second wireless communication method. The second frame is recognizable by the first wireless communication method but is not recognizable by the second wireless communication method.

14 Claims, 6 Drawing Sheets

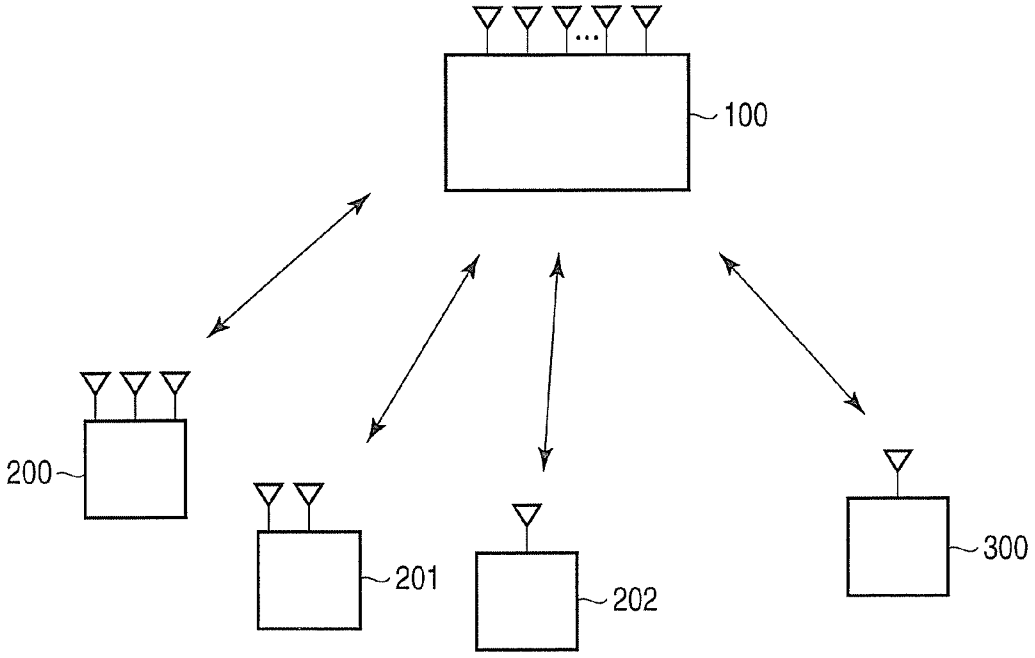
F I G. 1
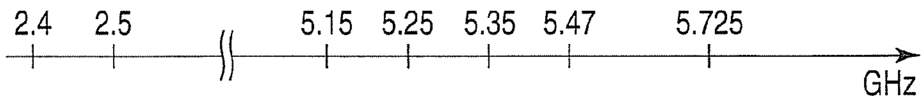
F I G. 2

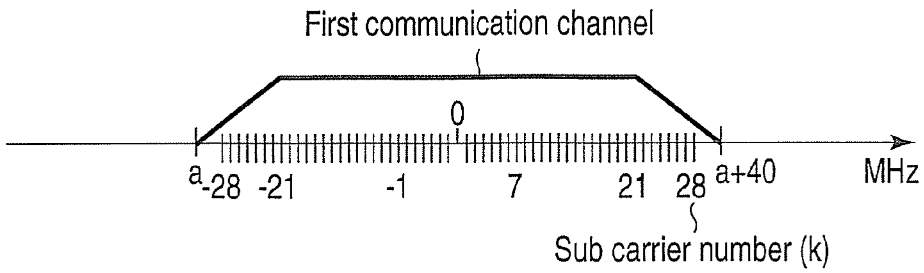
F I G. 3
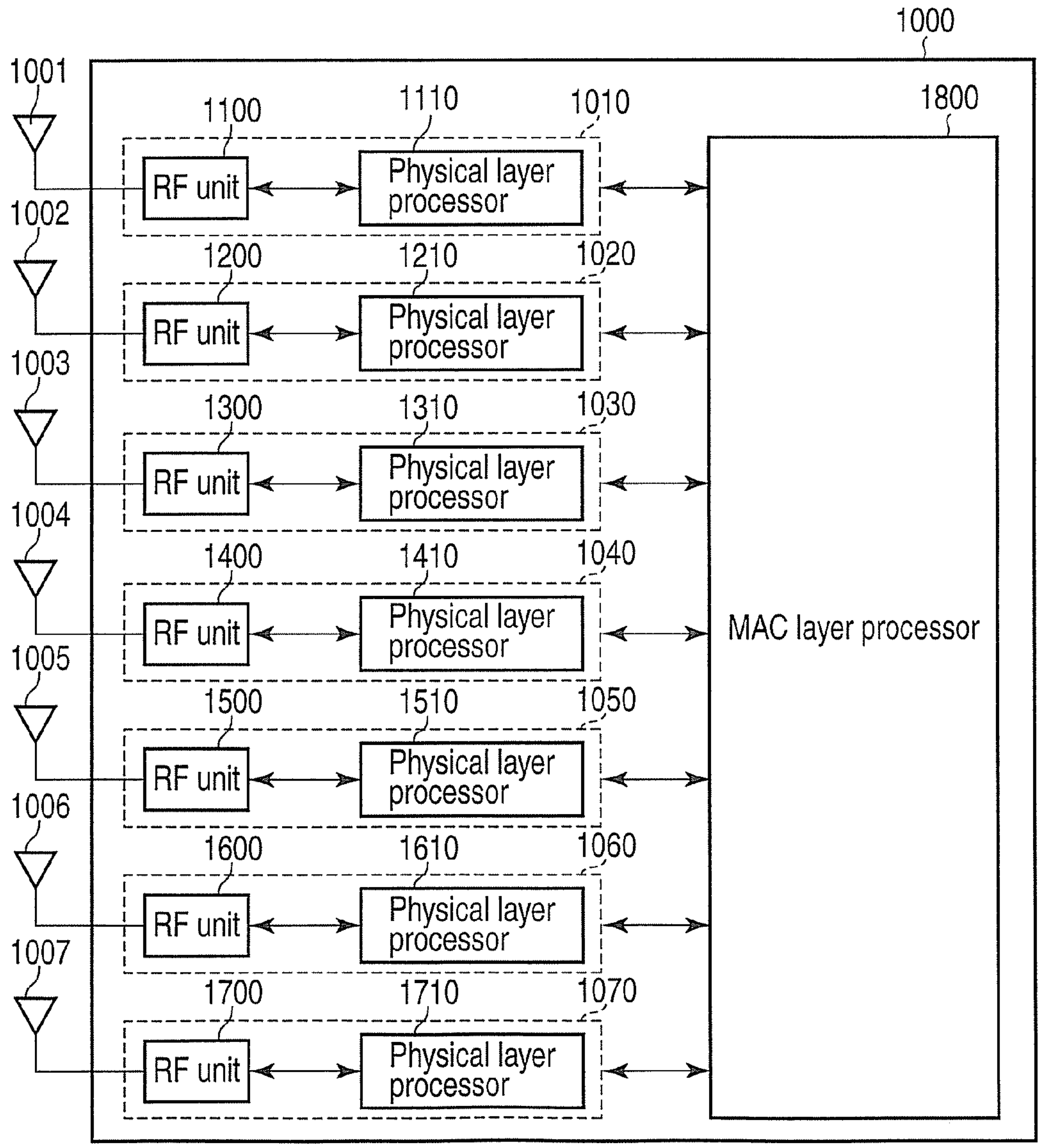
F I G. 4

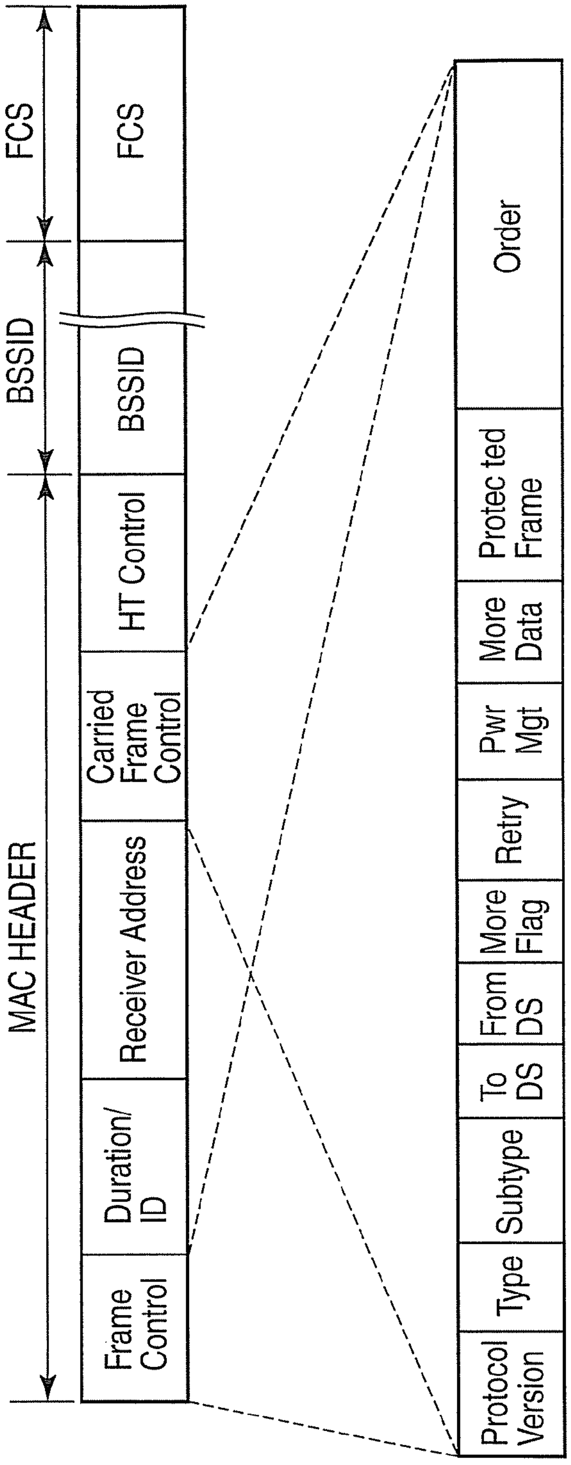
F I G. 5 A
F I G. 5 B

| Type Value | | Subtype Value | | | | Subtype description |
|---|---|---|---|---|---|---|
| Bit3 | Bit3 | Bit7 | Bit6 | Bit5 | Bit4 | |
| 0 | 1 | 0 | 1 | 1 | 1 | Control Wrapper |
| 0 | 1 | 1 | 1 | 1 | 0 | CF-End |

FIG. 6

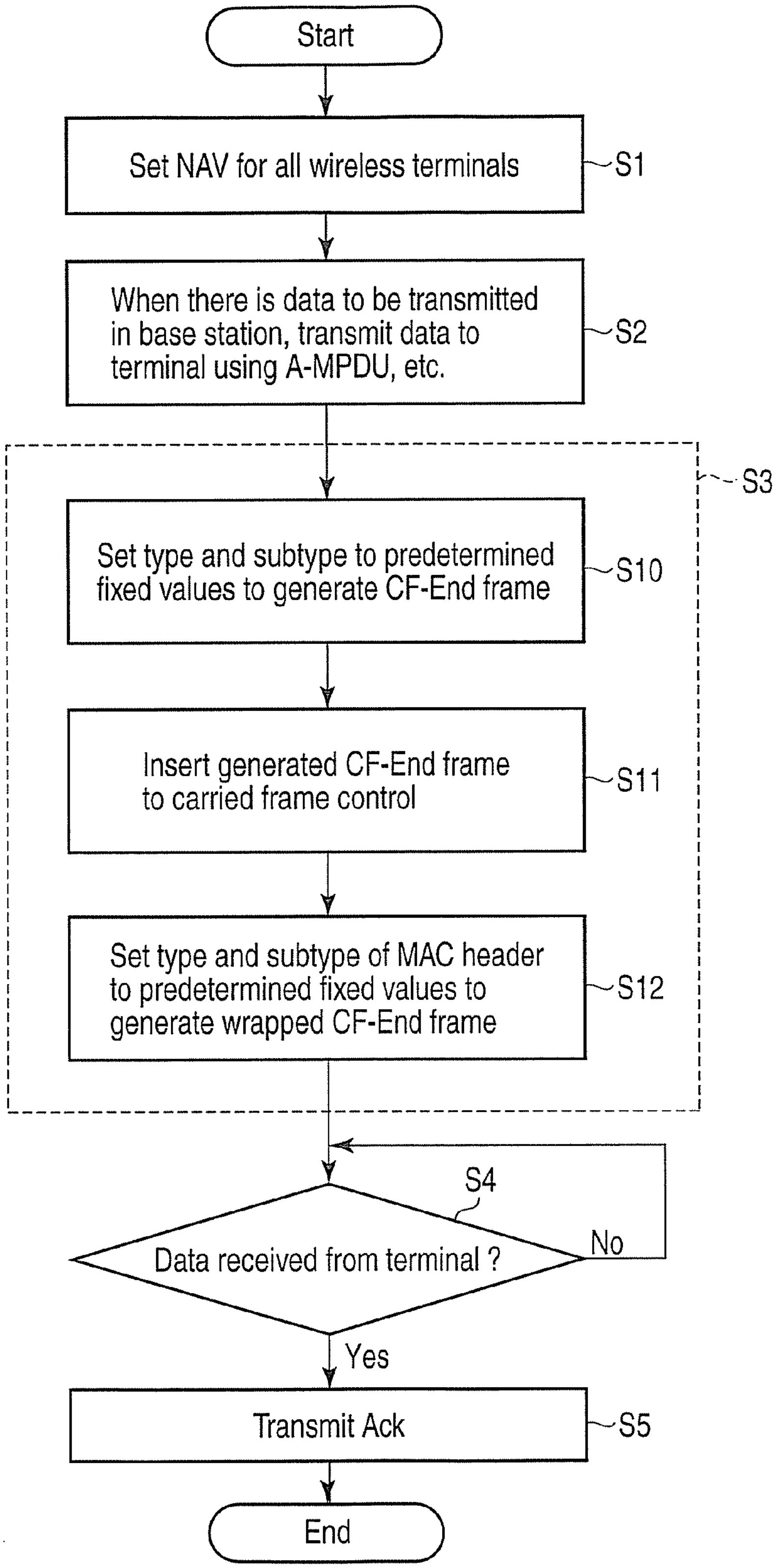
F I G. 7

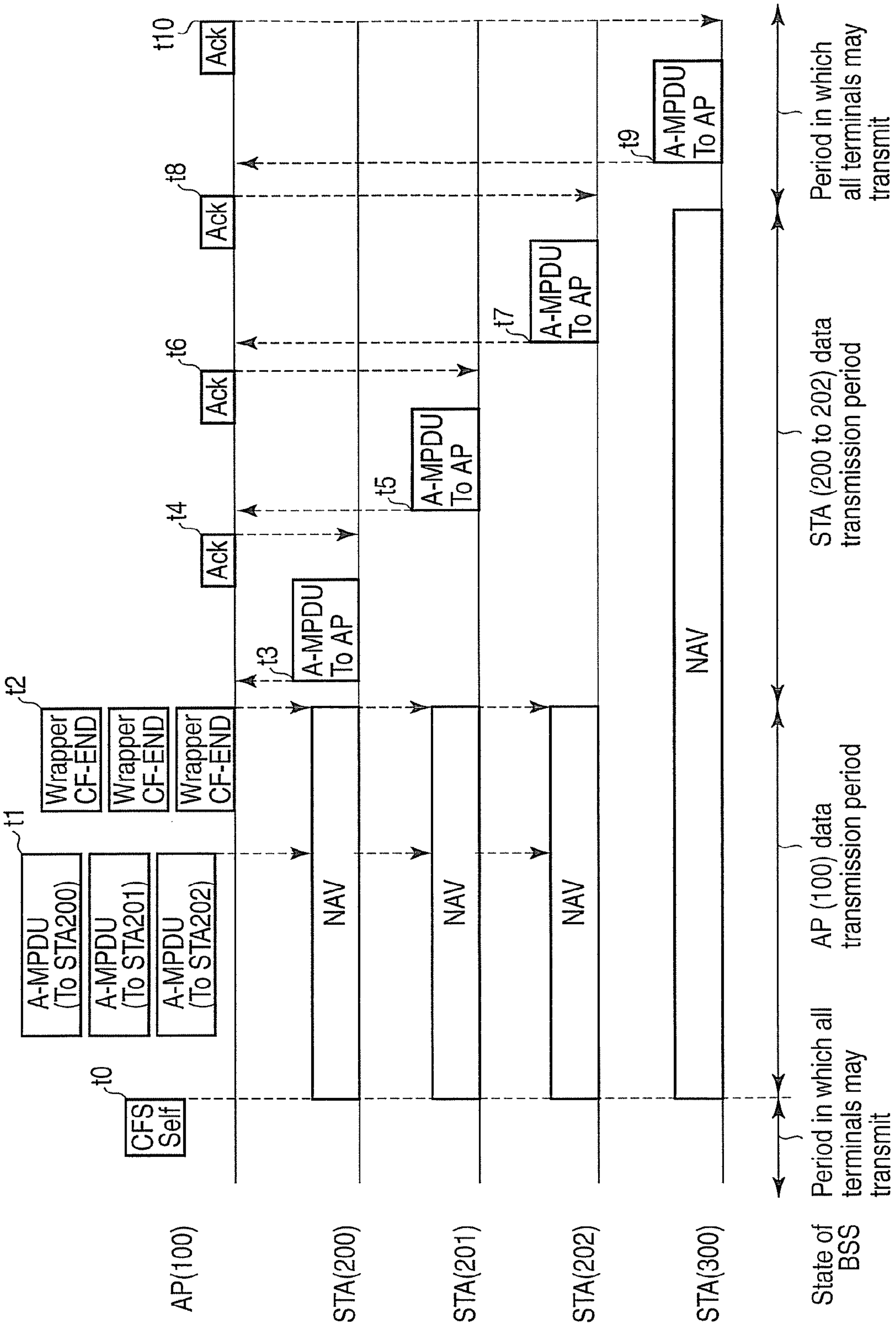
F I G. 8

WIRELESS COMMUNICATION DEVICE AND COMMUNICATION METHOD THEREOF

CROSS-REFERENCE TO RELATED APPLICATIONS

This application is based upon and claims the benefit of priority from Japanese Patent Application No. 2010-211276, filed Sep. 21, 2010; the entire contents of which are incorporated herein by reference.

FIELD

Embodiments described herein relate generally to a wireless communication device, which realizes wireless communication complying with the IEEE 802.11ac standard at high throughput.

BACKGROUND

Multi-input-multi-output (MIMO) communication is defined in the IEEE 802.11n standard. In MIMO communication, all the streams simultaneously transmitted from a plurality of antennas are transmitted to a wireless terminal. This is referred to as single MIMO communication. Meanwhile, a stream is transmitted from an antenna.

The IEEE 802.11ac standard is now being formulated as a next generation communication standard of the IEEE 802.11n standard, and by this, communication by a multi-user MIMO method, which performs wireless communication between the wireless base station and a plurality of wireless terminals, is studied.

Unlike single-user MIMO communication, in multi-user MIMO communication, a plurality of streams simultaneously transmitted from a plurality of antennas may be transmitted to different terminals. In general, in the wireless communication including single-/multi-user MIMO communication, an uplink and downlink pair is often formed between the wireless base station and the wireless terminals and made the transmission and reception of the data.

In a wireless communication system in which a wireless communication device complying with multi-user MIMO communication and a wireless communication device which performs wireless communication according to a standard other than this standard are accommodated, it is required to efficiently transmit and receive the data.

BRIEF DESCRIPTION OF THE DRAWINGS

FIG. 1 is a schematic diagram of a wireless communication system in which a wireless base station according to an embodiment accommodates a plurality of wireless terminals;

FIG. 2 is a frequency band diagram available for the wireless communication system according to the embodiment;

FIG. 3 is a schematic diagram of a communication channel used in the wireless communication system according to the embodiment;

FIG. 4 is a block diagram illustrating an internal configuration of the wireless base station according to the embodiment;

FIGS. 5A and 5B are data formats of a MAC frame generated by a MAC layer processor according to the embodiment;

FIG. 6 is a schematic diagram of a value set in a MAC frame according to the embodiment;

FIG. 7 is a flowchart illustrating data transmission/reception of the wireless communication system according to the embodiment; and FIG. 8 is a timing chart illustrating the data transmission/reception of the wireless communication system according to the embodiment.

DETAILED DESCRIPTION

Hereinafter, an embodiment is described with reference to the drawings. In this description, a common reference number is assigned to a common part throughout the drawings.

In general, according to one embodiment, a wireless communication device includes a first transmitting/receiving unit, a first physical layer processor, and a first MAC layer processor. The first transmitting/receiving unit transmits at least one first wireless signal and receives a second wireless signal corresponding to the first wireless signal by a first wireless communication method using a frequency band with a certain bandwidth. The first physical layer processor decodes the second wireless signal to obtain a frame and encodes a frame of the first wireless signal to be transmitted. The first MAC layer processor supplies a control frame generated by embedding a first frame to a MAC header of a second frame to the physical layer processor as the frame. The first frame is recognizable by the first wireless communication method and a second wireless communication method different from the first wireless communication method. The second frame is recognizable by the first wireless communication method but is not recognizable by the second wireless communication method.

FIG. 1 is a schematic diagram of a wireless communication system in which a wireless base station accommodates a plurality of wireless terminals to perform wireless communication using a MIMO communication method. That is to say, the wireless communication according to the IEEE 802.11ac standard, that is to say, multi-user MIMO communication is performed in multiple communications between the wireless base station and a plurality of wireless terminals.

The wireless communication system according to this embodiment gives priority to data transmission/reception between devices supporting the IEEE 802.11ac standard, thereby improving throughput. Therefore, the data transmission/reception between the wireless terminal supporting a standard other than the IEEE 802.11ac, such as the IEEE 802.11g, a, and b, and the wireless base station is performed after the data transmission/reception of the wireless terminal supporting the IEEE 802.11ac standard.

As illustrated in FIG. 1, the wireless communication system according to this embodiment includes a wireless base station 100, a plurality of wireless terminals 200 to 202, and a wireless terminal 300 and wireless communication is performed among them. A unit composed of the wireless base station 100 and at least one wireless terminal is referred to as a basic service set (BSS) in the IEEE 802.11 standard. Meanwhile, although a case in which four wireless terminals are included in the BSS is illustrated in FIG. 1, the number of the wireless terminals is not especially limited as far as a specific address of each is recognizable. Also, one or a plurality of antennas may be mounted on the wireless base station 100, wireless terminals 200 to 202, and wireless terminal 300 according to the communication method in the wireless communication system. That is to say, in the BSS, the wireless terminal provided with an antenna or that provided with a plurality of antennas may be mixed. In this embodiment, wireless terminal 200 is provided with three antennas, wireless terminals 201 and 202 are provided with two antennas, respectively, and wireless terminal 300 is provided with an antenna.

In this embodiment, each of wireless terminals 200 to 202 is provided with a configuration capable of performing multi-user MIMO communication with the wireless base station 100. That is to say, each of wireless terminals 200 to 202 is the terminal complying with the IEEE 802.11ac standard. On the other hand, wireless terminal 300 is provided with a configuration to perform wireless communication complying with the IEEE 802.11n communication standard and older. Specifically, this is a device, which performs wireless communication according to a communication standard such as IEEE 802.11g, 11a, 11b, and 11n.

<Available Band Diagram>

FIG. 2 is a band diagram illustrating a frequency band available for the wireless communication system according to this embodiment. As illustrated, the available frequency band is a band from 2.40 to 2.50 GHz, a band from 5.15 to 5.35 GHz, and a band from 5.47 to 5.725 GHz. Out of the frequency bands, a communication channel in the band from 5.15 to 5.25 GHz is limited to indoor use in general, and a communication channel in the band from 5.25 to 5.35 GHz and a communication channel in the band from 5.47 to 5.725 GHz have large transmission power and are the communication channels also available out of doors.

<Configuration Diagram of Communication Channel>

FIG. 3 is a schematic diagram of the communication channel used in the wireless communication system according to this embodiment. As illustrated in FIG. 3, the wireless communication system uses a first frequency band with a bandwidth of 40 MHz from a MHz to (a+40) MHz, for example. Hereinafter, the band corresponding to the first frequency band is referred to as a first communication channel. Meanwhile, although a case in which the bandwidth of the first frequency band is 40 MHz is described as an example in this embodiment, this is no more than an example. For example, the bandwidth of the first frequency band may be 80 MHz and the like, and there is no limitation in a value of the bandwidth.

As illustrated in FIG. 1, the wireless base station 100 is provided with seven antennas, for example. The first communication channel is used by the seven antennas. Specifically, a plurality of subcarriers arranged in the first communication channel are used by the antennas. The subcarriers are also referred to as carrier waves and are a plurality of frequencies provided in the first communication channel. Data is transmitted by the subcarriers.

FIG. 3 illustrates a state in which a plurality of subcarriers are arranged in the first communication channel. In this embodiment, for example, there are 28 frequencies on each of right and left sides of a center frequency, that is to say, a total of 56 subcarriers are used in wireless communication.

A number corresponding to the 56 subcarriers (hereinafter, referred to as a subcarrier number) is set to k. Herein, the value of k is any numeric value from −28 to 28 (except 0) corresponding to 56 subcarrier numbers. As illustrated, the number corresponding to the subcarrier of a highest frequency of the first communication channel is set to k=28 and the number corresponding to the subcarrier of a lowest frequency is set to k=−28. Also, the number corresponding to a second highest subcarrier is set to k=27 and the number corresponding to a second lowest subcarrier is set to k=−27. Hereinafter, similarly, the numbers corresponding to the subcarriers are assigned to k=−1, 1.

In the wireless communication device using orthogonal frequency division multiplexing (OFDM) modulation, wireless communication is performed by superimposing a signal on each of the 56 subcarriers.

In the multi-user MIMO communication method, each antenna transmits the data to a plurality of wireless terminals using a plurality of subcarriers. Herein, the wireless signal transmitted from an antenna is referred to as a stream, and a plurality of subcarriers are used by a stream. Also, an aggregate of the subcarriers is referred to as a sub-channel. That is to say, when the data is transmitted in a stream, one or more sub-channels are used, for example.

In this embodiment, the wireless base station 100 transmits the data to wireless terminal 200 using three antennas, for example. That is to say, the wireless base station 100 transmits the data in three streams.

Also, the wireless base station 100 transmits the data to wireless terminal 201 using two antennas, for example. That is to say, the wireless base station 100 transmits the data to wireless terminal 201 using two streams.

Also, the wireless base station 100 transmits the data to wireless terminal 202 using an antenna, for example. That is to say, the wireless base station 100 transmits the data to wireless terminal 202 using a stream. In this wireless communication, the number of streams used in the data transmission to the wireless terminal is not limited to this and this may be changed according to an environment of a transmission path. That is to say, when the transmission path is excellent, the data may be transmitted to the wireless terminal in four or five streams using four or five antennas, for example, or the number of subcarriers used for an antenna may be increased, for example, without increasing the number of the antennas to be used.

<Internal Configuration Example of Wireless Base Station>

Next, an internal configuration example of the wireless base station 100 is described with reference to FIG. 4. FIG. 4 is a block diagram of the wireless base station 100. Meanwhile, internal configuration examples of wireless terminals 200 to 202 and wireless terminal 300 are identical to the internal configuration of the wireless base station 100, so that the description thereof is not repeated here.

As illustrated, the wireless base station 100 is provided with antennas 1001 to 1007, communication modules 1010 to 1070 corresponding to antennas 1001 to 1007, respectively, and a MAC layer processor 1800. Also, each of communication modules 1010 to 1070 is provided with a radio-frequency (RF) unit and a physical layer processor.

Specifically, communication module 1010 is provided with an RF unit 1100 and a physical layer processor 1110. Also, communication module 1020 is provided with an RF unit 1200 and a physical layer processor 1210. Hereinafter, this is similar to communication modules 1030 to 1070, so that the description thereof is not repeated here. Meanwhile, when communication modules 1010 to 1070 are not distinguished from one another, they are simply referred to as communication modules. As for the RF units 1100 to 1700 and the physical layer processors 1110 to 1710 also, they are simply referred to as the RF units and the physical layer processors, respectively, when they are not distinguished from one another.

As described above, the wireless base station 100 performs the wireless communication with the wireless terminals using the multi-user MIMO communication method. As described above, in this embodiment, the wireless base station 100 performs the wireless communication with wireless terminal 200 using antennas 1001 to 1003, performs the wireless communication with wireless terminal 201 using antennas 1004 and 1005, and further performs the wireless communication with wireless terminal 202 using antenna 1006, for example. Also, the wireless base station 100 performs the wireless communication according to a wireless standard of wireless terminal 300 using antenna 1007, for example. Meanwhile, combination of wireless terminals 200 to 202 and 300 and the antennas used in the wireless communication is not limited to the above-description.

Hereinafter, the configuration of the wireless base station 100 is described by taking antenna 1001 and communication module 1010 as an example. That is to say, as for antennas 1002 to 1007 and the communication modules corresponding to the antennas also, the configuration is identical to that of antenna 1001 and the communication module corresponding to the antenna, so that the description thereof is not repeated here.

Antenna 1001 receives the wireless signal (RF signal: analog signal) transmitted from wireless terminal 200 and transmits the wireless signal to wireless terminal 200.

When receiving the wireless signal, the RF unit 1100 down-converts the wireless signal (analog signal) of 5 GHz band, for example, received by antenna 1001 to supply to the physical layer processor 1110. That is to say, by down-converting, a base band signal of the received signal is obtained. When transmitting the wireless signal, the RE unit 1100 up-converts the analog signal (base band signal) supplied from the physical layer processor 1110 to the wireless signal of the 5 GHz band to transmit from antenna 1001.

Next, the physical layer processor 1110 is described. The physical layer processor 1110 performs A/D conversion to the received signal supplied from the RF unit 1100 and down-converted to obtain a digital signal. Further, the physical layer processor 1110 performs a demodulation process to the digital signal. That is to say, the physical layer processor 1110 performs demodulation and error-correction decoding by the OFDM, for example, to obtain a received frame.

Then, the physical layer processor 1110 outputs the obtained received frame to the MAC layer processor 1800. The physical layer processor 1110 may perform the demodulation using a direct sequence method represented by a spread spectrum method in addition to the OFDM.

Also, when transmitting the data, the physical layer processor 1110 performs a predetermined modulation process to the transmitted data supplied from the MAC layer processor 1800 and then up-converts the same to supply to the RF unit 1100.

Next, the MAC layer processor 1800 is described. The MAC layer processor 1800 performs predetermined access control complying with the IEEE 802.11. Specifically, a carrier sense multiple access with collision avoidance (CSMA/CA) method is executed. The CSMA/CA method is a method to determine whether to transmit the frame after observing a use condition of a wireless environment and a method to confirm whether there is the wireless communication device, which performs the wireless communication, around the same before transmitting the frame. The frame is intended to mean transmitted/received data assembled so as to be communicated by the wireless communication. When the MAC layer processor 1800 judges that the wireless communication is not performed around the same, the MAC layer processor 1800 aggregates the frame to transmit to the physical layer processor 1110. In the IEEE 802.11n standard and newer, an aggregate MPDU (A-MPDU) to transmit a plurality of MAC protocol data units (MPDUs) as a single PHY protocol data unit (PPDU) is adopted. To aggregate the frames is to bring the MPDUs together into the single PPDU to make the A-MPDU. Also, in this specification, when the MPDU and the A-MPDU are not distinguished from each other, they are simply referred to as the frame.

The MAC layer unit 1800 removes a media access control (MAC) header from the received base band received signal (frame) to assemble a packet. The packet is intended to mean the transmitted/received data assembled to have a data structure, which may be handled in a personal computer and the like. Further, the MAC layer processor 1800 performs a process to transmit an acknowledgment (Ack) frame, which acknowledges the received frame. The Ack frame also is provided with information of whether there is a lacking frame out of aggregate frames transmitted from wireless terminals 200 to 202 and 300. For example, a case in which five frames, for example, are aggregated from wireless terminals 200 to 202 and 300 and four frames out of them reach the wireless base station 100 is considered. In this case, in the Ack frame transmitted from the wireless base station 100, information indicating that there is a lacking frame is set.

On the other hand, when transmitting, the frame is assembled by adding the MAC header to the data to be transmitted, and thereafter, the assembled frame is output to the physical layer processor 1110.

As described above, the wireless base station 100, which uses the multi-user MIMO communication method, performs the wireless communication using wireless terminal 200 and a total of three antennas, which are antennas 1001 to 1003, for example. According to this, the MAC layer processor 1800 divides the aggregated frame to be transmitted into three parts to supply to the physical layer processors 1110 to 1310.

Similarly, the MAC layer processor 1800 divides the aggregated frame into two parts and supplies the divided frames to physical layer processors 1410 and 1510. Also, the MAC layer processor 1800 supplies the aggregated frame to physical layer processors 1610 and 1710.

Next, a MAC frame generated by the MAC layer processor 1800 is described. In the MAC layer processor 1800 according to this embodiment, a control wrapper frame standardized by the IEEE 802.11n is used as a transmitted frame. By setting a value of a predetermined field in the frame, the control wrapper frame is generated. Specifically, a predetermined fixed value is set in a "subtype" field in a frame format to be described later. Meanwhile, since the control wrapper frame is standardized by the IEEE 802.11n, the wireless terminal, which performs the wireless communication according to the communication standard such as the IEEE 802.11a, 11b, and 11g, cannot interpret the frame. That is to say, the control wrapper frame may be discriminated only by the wireless terminal complying with the IEEE 802.11ac and un standard.

The control wrapper frame is provided with a function to perform unicast transmission of an encapsulated control frame. According to this, the wireless base station 100 may encapsulate the frame, which controls the wireless communication, to perform the unicast transmission.

Hereinafter, the encapsulated frame is described. In this embodiment, the MAC layer processor 1800 inserts a contention free end (CF-End) frame into a predetermined frame field in the MAC header to be described later to encapsulate the same by the control wrapper frame. Meanwhile, the CF-End frame is the control frame standardized before the IEEE 802.11n. The encapsulated CF-End frame is referred to as a wrapped CF-End frame. That is to say, although the CF-End frame is recognizable by the wireless device complying with the communication standard before the IEEE 802.11n, the CF-End frame is set to the control frame recognizable only by the wireless device complying with the IEEE 802.11ac and un standards, by being set to the wrapped CF-End frame.

Further, in this embodiment, the wrapped CF-End frame is transmitted using the IEEE 802.11ac standard, that is to say, the multi-user MIMO communication method. According to this, the wireless terminal complying with the IEEE 802.11n standard cannot recognize the wrapped CF-End frame.

The CF-End frame is generated by setting a value of a predetermined field in the frame. Specifically, a predetermined fixed value is set in the "subtype" field in the frame format to be described later. Meanwhile, to encapsulate is to insert the control frame (CF-End frame in this embodiment) into the frame field composing the control wrapper frame, which serves as the control frame.

Meanwhile, the CF-End frame is a frame provided with a function to assign transmission opportunity of uplink data from wireless terminals 200 to 202 and wireless terminal 300 to the wireless base station 100. That is to say, a transmission inhibiting period of the uplink data of the wireless terminal, which recognizes the control wrapper frame, is cancelled by the CF-End frame. Therefore, the wireless terminal of which transmission inhibiting period is cancelled may transmit the data to the wireless base station 100.

The frame format according to this embodiment is described with reference to FIGS. 5A and 5B. As illustrated in FIG. 5A, the MAC frame generated by the MAC layer processor 1800 includes the MAC header, basic service set identification (BSSID), and frame check sequence (FCS).

Information required for a reception process in the MAC layer is set in the MAC header unit. Specifically, the MAC header unit includes a value indicating a type of the frame (a data frame used when transmitting user data, a management frame used in a Bacon frame and the like, the control frame such as the Ack frame), (a plurality of) address fields in which MAC addresses of a direct destination, a final destination, and a source are set, a sequence control field in which a sequence number of the data to be transmitted and a fragment number when fragmenting the data are set.

The address of the source (MAC address of the base station 100) is set in the BSSID field.

A cyclic redundancy code (CRC) is set in the FCS unit. Herein, the CRC is used for judging whether the data held by the MAC header unit and a frame body unit is normally received.

The above-described MAC header is described in detail. The MAC header is provided with a frame control field, a duration/ID field, at least one receiver address field, a carried frame control field, and a HT control field.

Values according to types of the above-described frames are set in the frame control field. Specifically, a plurality of fields, which form the frame control field to be described later, are inserted.

Successive band reservation time is set after the transmission of the transmitted frame in the duration/ID field.

The MAC addresses of the direct destination, the final destination, and the source of the data are set in the receiver address field. In this embodiment, the MAC addresses of wireless terminals 200 to 202 are set.

The "frame control" field of the CF-End frame to be described later is inserted into the carried frame control field. Meanwhile, the CF-End frame format is formed of each field of "frame control", "duration/ID", "receiver address", and "FCS" sequentially.

The frame format of a high throughput control field determined by the IEEE 802.11n standard is set in the HT control field.

Next, the frame control field described above is described in detail with reference to FIG. 5B. In this embodiment, the frame control field in FIG. 5B, which is set the control wrapper, is set in the frame control field in FIG. 5A, and the frame control field in FIG. 5B, which is set the CF-End, is set in the carried frame control field in FIG. 5A.

The frame control field is provided with a protocol version type field, a subtype field, a "To DS" field, a "From DS" field, a more fragment field, a retry field, a power management (Pwr Mgt), a more data field, a protected frame field, an order field and the like.

The protocol version indicates a version of the MAC protocol.

Information indicating the type of the frame to be described later is set in the type field and the subtype field. The destination of the data may judge which of the control frame, the management frame, and the data frame the frame is by bit information set in the type field. Meanwhile, the frame transmitted to the wireless terminal is the control frame in this embodiment.

Also, the type of the frame is determined by setting the bit information of the subtype field. As described above, in this embodiment, the frame is set the control wrapper frame and the CF-End frame by setting the bit information to a predetermined value.

Information indicating whether to perform the communication via the wireless base station 100 illustrated in FIG. 1 is stored in the "To DS" field and the "From DS" field. In general, the wireless base station 100 exchanges the data with another wireless communication base station not illustrated with a wired LAN network not illustrated as a backbone. A network, which connects the wireless base station 100 and the wireless base station not illustrated, is referred to as a distribution system (DS). That is to say, it is indicated whether the data is exchanged between another wireless base station not illustrated and wireless terminals 200 to 202 and wireless terminal 300 via the wireless base station 100.

The more fragment field holds information indicating whether there is a successive fragment frame when the data is fragmented.

The retry field indicates whether the frame transmitted from the wireless base station 100 to the wireless terminal is a retransmitted frame of a previous frame.

The power management is a value set by the wireless terminal and is used for power conservation.

The more data field is used when transmitting the frame to the wireless terminal in a power conservation mode. That is to say, a value corresponding whether there is a frame to be added to the wireless terminal in the power conservation mode is set in the more data field.

Information of whether the frame is protected is set in the protected frame field.

It is indicated in the order field that an order of the frame cannot be changed when relaying the frame.

Next, values set in the "type" and the "subtype" fields when the frame is set the control field and the CF-End field are described with reference to FIG. 6. FIG. 6 is a schematic diagram illustrating bit values set in the "type" and the "subtype".

As illustrated in FIG. 6, 2-bit data is set in the type field. As described above, the type field indicates a type of the frame transmitted from the wireless base station 100. When values of bit 2 and bit 3 in the type field are set to 1 and 0, respectively, the type field indicates the control frame. The control wrapper field and the CF-End field used in this embodiment are the fields used in the control frame, respectively, so that the values of the type field are set to the above-described values.

4-bit data is set in the subtype field. As described above, the subtype field indicates the type of the frame transmitted from the wireless base station 100.

First, in a case of the control wrapper frame, values of bit4, bit5, bit6, and bit7 of the subtype field are set to 1, 1, 1, and 0, respectively, and when the subtype field indicates the CF-End frame, the values of bit4, bit5, bit6, and bit7 are set to 0, 1, 1, and 1, respectively.

<Operation of Wireless Communication System>

Next, data transfer operation between the above-described wireless base station 100 and wireless terminals 200 to 202 and wireless terminal 300 accommodated therein is described with reference to FIGS. 7 and 8. FIG. 7 is a flowchart illustrating operation of the wireless base station 100, and FIG. 8 is a timing chart illustrating the data transfer operation using the multi-user MIMO communication method.

First, at a step 1, the wireless base station sets a NAV to be described later for all the wireless terminals accommodated therein (FIG. 7, step 1). Specifically, as illustrated in FIG. 8, at a time to, the wireless base station 100 transmits a CTS self frame to itself (the wireless base station 100). The CTS self frame is provided with the "control frame", the "duration/ID", "destination address", and the "FCS". The CTS self frame is the frame, which stops the data transmission for a period set in the duration field (long network allocation vector (NAV)) when receiving the frame other than that addressed to itself. That is to say, when the destination address is the wireless base station 100, wireless terminals 200 to 202 and wireless terminal 300 other than this address stop the data transmission for the period set in the duration field. According to this, the NAV is set for wireless terminals 200 to 202 and wireless terminal 300. Meanwhile, until the CTS self frame is transmitted, it is a period in which all the terminals of the wireless base station 100, wireless terminals 200 to 202 and 300 may transmit the data to one another.

After setting the NAV for wireless terminals 200 to 202 and 300, it is a data transmission period by the wireless base station 100. That is to say, after the step 1, when it has data to be transmitted to wireless terminals 200 to 202 in the wireless base station 100, the wireless base station 100 transmits the A-MPDU to wireless terminals 200 to 202 using the multi-user MIMO communication method, for example (FIG. 7, step 2). In FIG. 8, since it has the transmitted data to be transmitted in the wireless base station 100, the wireless base station 100 transmits the aggregated frame (A-MPDU) to wireless terminals 200 to 202 at a time t1, respectively. As described above, the wireless base station 100 transmits the frame to wireless terminal 200 in the three streams, for example, transmits the frame to wireless terminal 201 in the two streams, for example, and transmits the frame to wireless terminal 202 in the one stream, for example. As described above, the MAC layer processor 1800 divides the data (frame) to be transmitted to wireless terminal 200 into the three parts to supply to the physical layer processors 1110 to 1310, respectively. Similarly, the MAC layer processor 1800 divides the data (frame) to be transmitted to wireless terminal 201 into the two parts to supply to the physical layer processors 1110 to 1310, respectively.

Thereafter, the wireless base station 100 transmits the generated wrapped CF-End frame to the terminal to which the wireless base station 100 wants to assign the transmission opportunity by the multi-user MIMO communication method. Specifically, the values stored in the type field and the subtype field are set to predetermined fixed values by the MAC layer processor, thereby generating the CF-End frame (FIG. 7, step 10). Next, the CF-End frame generated at the step 10 is inserted into the carried frame control field (FIG. 7, step 11). Thereafter, the predetermined fixed values are set in the type and subtype fields in the MAC header, thereby generating the wrapped CF-End frame (FIG. 7, step 12). Thereafter, as illustrated in FIG. 8, at a time t2, the wireless base station 100 transmits the wrapped CF-End frame generated at a step 3 to wireless terminals 200 to 202 to which the wireless base station 100 wants to assign the transmission opportunity. In general, the data communication often forms a data pair of downlink and uplink. Therefore, it is predicted that there is the uplink data from wireless terminals 200 to 202 and the transmission opportunity of the uplink data is assigned to wireless terminals 200 to 202. Also, as described above, the CF-End frame is a frame to inform cancellation of a NAV period. By this, the NAV period of wireless terminals 200 to 202 is finished. Herein, wireless terminals 200 to 202 decode downlink data from the wireless base station 100 to obtain the frame, and when judging that the frame is addressed to itself, execute the required process according to the wrapped CF-End frame. That is to say, as illustrated in FIG. 8, wireless terminals 200 to 202 transmit the uplink data to the base station 100.

As described above, the control wrapper frame transmitted according to the IEEE 802.11ac standard is recognizable only by the terminal complying with the IEEE 802.11ac standard, so that the NAV period is continued also after the time t2 in wireless terminal 300. That is to say, also when wireless terminal 300 is the terminal complying with the IEEE 802.11n standard, that is to say, the terminal, which performs a single MIMO communication method, the NAV is not canceled. Therefore, wireless terminal 300 is not able to transmit the data to the wireless base station 100.

After the cancellation of the NAV, it is a period in which the data may be transmitted from wireless terminals 200 to 202. That is to say, wireless terminals 200 to 202 start the uplink transmission of the data in competition with each other.

In this embodiment, at a time t3, wireless terminal 200 transmits the aggregated frame to the wireless base station 100, for example. When receiving the aggregated frame (FIG. 7, step 4, YES), the wireless base station 100 transmits the Ack frame to wireless terminal 200 at a time t4 (FIG. 7, step 5).

Next, at a time t5, wireless terminal 201 transmits the aggregated frame to the wireless base station 100, for example. The wireless base station 100, which receives this (FIG. 7, step 4, YES) transmits the Ack frame to wireless terminal 201 at a time t6 (FIG. 7, step 5).

Next, at a time t7, wireless terminal 202 transmits the aggregated frame to the wireless base station 100, for example. The wireless base station 100, which receives the same (FIG. 7, step 4, YES), transmits the Ack frame to wireless terminal 200 at a time t8 (FIG. 7, step 5).

Thereafter, the NAV period finishes at a time t9.

That is to say, after the time t9, it is a period in which the data may be freely transmitted by all the terminals, which are the wireless base station 100 and wireless terminals 200 to 202 and 300. Herein, at the time t9, wireless terminal 300 transmits the aggregated frame to the wireless base station 100. The wireless base station 100, which receives the same, transmits the Pick frame to wireless terminal 300 at a time t10.

Meanwhile, a transmission timing to the wireless base station 100 among wireless terminals 200 to 202 is merely an example, and an order is not limited to that illustrated in FIG. 7. Further, wireless terminals 200 to 202 continue to transmit each frame until the frame is transmitted to the wireless base station 100.

Meanwhile, a transmission available time is set for all the three wireless terminals 200 to 202 by transmitting the wrapped CF-End frame to all the three terminals to which downlink transmission is performed by the multi-user MIMO communication method. However, it is also possible that the wrapped CF-End frame is not transmitted to wireless terminal 202 and the wrapped CF-End frame is transmitted only to wireless terminals 200 and 201, thereby assigning the uplink transmission opportunity only to wireless terminals 200 and 201 in a case in which it is known in advance that wireless terminal 202 performs the communication in traffic in which the uplink transmission is not substantially required such as when streaming video from a server, for example.

Further, in an example of operation illustrated in FIG. 7, the wrapped CF-End frame is transmitted after performing the downlink transmission by the multi-user MIMO communication method. However, it is also possible to transmit the wrapped CF-End frame before the downlink transmission to cancel the NAV in advance, then continuously perform the downlink transmission. And it is also possible to perform only the wrapped CF-End frame transmission by the multi-user MIMO communication method without successively performing the downlink transmission to only set an uplink transmission available period of the wireless terminal of the destination.

<Effect According to this Embodiment>

The wireless communication device according to this embodiment may realize the communication at a high throughput between the wireless terminal complying with the IEEE 802.11ac standard and the wireless base station. That is to say, in the wireless communication system, which performs the data transmission by the multi-user MIMO communication method, when the wireless base station performs the downlink data transmission by the multi-user MIMO communication method to a plurality of destinations, by transmitting the frame in which the CF-End frame is inserted into the control wrapper frame to each destination, the NAV of only the terminal to which the data transmission is performed by the multi-user MIMO communication method may be cancelled and the uplink transmission opportunity may be assigned only to the wireless terminal, which performs the communication by the multi-user MIMO communication method. According to this, it becomes possible to perform the communication more efficient as an entire BSS by separating the communication available period of an existing low-speed communication terminal complying with only a lower standard such as the IEEE 802.11g, the IEEE 802.11n standards from the communication available period of the wireless terminal, which may perform the communication by the multi-user MIMO communication method by the IEEE 802.11ac, which is a higher standard. In addition, by preferentially instructing the uplink transmission just after the downlink transmission, it becomes possible to contribute to reduce latency in an upper protocol.

Therefore, when transmitting the downlink data from the wireless base station to a specific wireless terminal by the multi-user MIMO communication method, the throughput in the wireless communication system often becomes high by preferentially assigning the uplink data transmission opportunity to the wireless terminal to which the downlink data is transmitted. Meanwhile, although the multi-user MIMO communication method is described as an example in this embodiment, the communication method other than the multi-user MIMO communication method using the IEEE 802.11ac standard may be used as far as a specific terminal may recognize the CF-End frame encapsulated by the control wrapped frame.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device, comprising:

a first transmitter/receiver which transmits at least one first wireless signal and receives a second wireless signal corresponding to the at least one first wireless signal by a first wireless communication method using a frequency band with a certain bandwidth;

a first physical layer processor which decodes the second wireless signal to obtain a frame and encodes a frame of the at least one first wireless signal to be transmitted; and a first MAC layer processor which supplies a control frame generated by embedding a first frame, which is recognizable by the first wireless communication method and a second wireless communication method different from the first wireless communication method, in a MAC header of a second frame, which is recognizable by the first wireless communication method but is not recognizable by the second wireless communication method, to the physical layer processor as the frame of the at least one first wireless signal, wherein the first frame is a CF-End Frame (contention free end frame) including a first field and a second field, each of which is capable of holding a plurality of bits, and the first MAC layer processor generates information indicating transmission permission of the second wireless signal by setting predetermined values in the first and second fields.

2. The wireless communication device according to claim 1, wherein the second frame includes an address field, and the frame of the at least one first wireless signal transmitted by the first transmitter/receiver is received by a first wireless terminal corresponding to a destination set in the address field in the second frame.

3. The wireless communication device according to claim 2, further comprising:

the first wireless terminal which performs wireless communication with the wireless communication device using the first wireless communication method, wherein the first wireless terminal includes:

a second transmitter/receiver which receives the at least one first wireless signal and transmits the second wireless signal;

a second physical layer processor which decodes the at least one first wireless signal to obtain the second frame; and a second MAC layer processor which analyzes the second frame to confirm whether the destination set in the address field corresponds to the first wireless terminal, and wherein, when the second MAC layer processor judges that the destination corresponds to the first wireless terminal, the first wireless terminal transmits the second wireless signal by using the second transmitter/receiver.

4. The wireless communication device according to claim 1, further comprising:

a second transmitter/receiver which transmits a third wireless signal and receives a fourth wireless signal corresponding to the third wireless signal, wherein a plurality of carrier waves arranged in the frequency band are provided in the frequency band used by the first and second transmitters/receivers, and the first transmitter/receiver transmits the at least one first wireless signal to a first destination address using M (M:

natural number not smaller than 1) carrier wave out of the plurality of carrier waves, and the second transmitter/receiver transmits the third wireless signal to a second destination address different from the first destination address using N (N: natural number not smaller than 1) second carrier wave other than the M carrier wave used by the first transmitter/receiver out of the plurality of carrier waves.

5. The wireless communication device according to claim 1, wherein the first wireless communication method is a multi-user MIMO communication method using the IEEE 802.11ac communication standard.

6. The wireless communication device according to claim 1, wherein the first transmitter/receiver transmits a third frame to stop data transmission from a wireless terminal for a certain period before transmitting the second frame generated by the first MAC layer processor.

7. A wireless communication device, comprising:

each of a plurality of transmitters/receivers which simultaneously performs a plurality of wireless communications by a first wireless communication method using a plurality of carrier waves included in frequency bands with a certain bandwidth;

a plurality of physical layer processors each corresponding to each of the plurality of transmitters/receivers, respectively, each physical layer processor decodes a respective signal received by the corresponding transmitter/receiver to obtain a respective incoming frame and encodes a respective outgoing frame to obtain a respective transmitted signal corresponding to the received respective signal; and a MAC layer processor, which divides an outgoing frame into a number of divided frames corresponding to a number of the transmitters/receivers used in the wireless communications, sets an identical destination to each of the divided frames having an identical destination, and then supplies the divided frames of identical destination to the corresponding physical layer processors, wherein the MAC layer processor supplies a first control frame, which is recognizable by the first wireless communication method but is not recognizable by a second wireless communication method different from the first wireless communication method, to the corresponding physical layer processors, the MAC layer processor embeds a second control frame, which is recognizable by the first wireless communication method and the second wireless communication method different from the first wireless communication method in a MAC header of the first control frame, and wherein the second control frame is a CF-End frame including a first field and a second field, each of which is capable of holding a plurality of bits; and the MAC layer processor generates information indicating transmission permission of a first wireless signal by setting predetermined values in the first and second fields.

8. The wireless communication device according to claim 7, wherein the each transmitter/receiver receives the first wireless signal corresponding to a second wireless signal transmitted in the wireless communications, the first control frame includes an address field, and the respective frames of the second wireless signal transmitted by the each transmitter/receiver are received by a wireless terminal corresponding to a destination set in the address field in the first control frame.

9. The wireless communication device according to claim 7, wherein the first wireless communication method is a multi-user MIMO communication method using the IEEE 802.11ac communication standard.

10. The wireless communication device according to claim 7, wherein the each transmitter/receiver transmits a third frame, which stops data transmission from a wireless terminal for a certain period, before transmitting the first control frame generated by the MAC layer processor.

11. A wireless communication method, comprising:

embedding a first control frame supporting a first wireless communication method and a second wireless communication method different from the first wireless communication method in a MAC header of a second control frame supporting the first wireless communication method but not supporting the second wireless communication method;

transmitting the second control frame to a first terminal by the first wireless communication method;

judging, by the first terminal, whether an address set in the second control frame is the address of the first terminal when the first terminal receives the second control frame; and executing a process corresponding to the first control frame when the address is the address of the first terminal, wherein the first control frame is a CF-End frame including information indicating transmission permission of data by the first terminal, and wherein the process is transmission of data in accord with the transmission permission in the first control frame.

12. The method according to claim 11, wherein the first terminal transmits data as the process when the first terminal has data to be transmitted.

13. The method according to claim 11, comprising:

transmitting a third control frame for stopping transmissions by the first terminal and data transmission from a second terminal, which performs wireless communication using the second wireless communication method, for a certain period; and transmitting aggregated transmitted data to the first terminal as necessary prior to transmitting the second control frame for allowing the first terminal to perform the process.

14. The method according to claim 11, wherein the first wireless communication method is a multi-user MIMO communication method using the IEEE 802.11ac communication standard.

* * * * *